United States Patent [19]

Grant

[11] 4,194,661
[45] Mar. 25, 1980

[54] TAPE ADVANCING METHODS AND APPARATUS

[75] Inventor: Frederic F. Grant, Bellflower, Calif.

[73] Assignee: Bell & Howell Company, Chicago, Ill.

[21] Appl. No.: 968,330

[22] Filed: Dec. 11, 1978

[51] Int. Cl.² .................................... B65H 17/28
[52] U.S. Cl. .................................... 226/95; 226/190
[58] Field of Search ............... 226/95, 97, 183–193; 360/90–104, 84; 406/197, 198; 242/182–185

[56] References Cited

U.S. PATENT DOCUMENTS

| | | | |
|---|---|---|---|
| 3,122,295 | 2/1964 | Davison et al. | 226/95 X |
| 3,143,267 | 8/1964 | Maxey | 226/95 |
| 3,443,039 | 5/1969 | Bygnes | 360/104 |
| 3,560,946 | 2/1971 | Ehalt et al. | 340/174.1 |
| 3,614,338 | 10/1971 | Bogels | 360/102 |
| 3,688,956 | 9/1972 | Kjos | 226/95 X |
| 3,840,895 | 10/1974 | Kubo | 360/84 |
| 3,872,507 | 3/1975 | Sano et al. | 360/102 |
| 4,029,249 | 6/1977 | Nagel et al. | 226/95 |
| 4,054,929 | 10/1977 | Levy | 360/90 |
| 4,065,044 | 12/1977 | Painter | 226/188 |

OTHER PUBLICATIONS

DC Motors Speed Controls Servo Systems Engineering Handbook, Electro-Craft Corp. pp. 7-30 to 7-37 3rd. Edition, Oct., 1975.

*Primary Examiner*—Leonard D. Christian
*Attorney, Agent, or Firm*—Benoit Law Corporation

[57] ABSTRACT

Methods and apparatus for advancing a tape with a tape capstan rotating about an axis provide the capstan with circumferential grooves distributed across the capstan and withdraw air from each groove for attracting the tape to the capstan. The tape is guided to a first peripheral capstan region extending across the capstan and is shieleded against the withdrawal of air in each groove during such guiding to the first peripheral capstan region. The tape is attracted to the capstan by the withdrawal of air in each groove at the first peripheral capstan region and is advanced with the rotating capstan through an arc to a second peripheral capstan region extending across the capstan, while being maintained attracted to the capstan by withdrawal of air from each groove. The tape is released from the capstan at the second peripheral capstan region, is guided away from the capstan and is shielded against withdrawal of air in each groove during such guiding away from the capstan.

28 Claims, 6 Drawing Figures

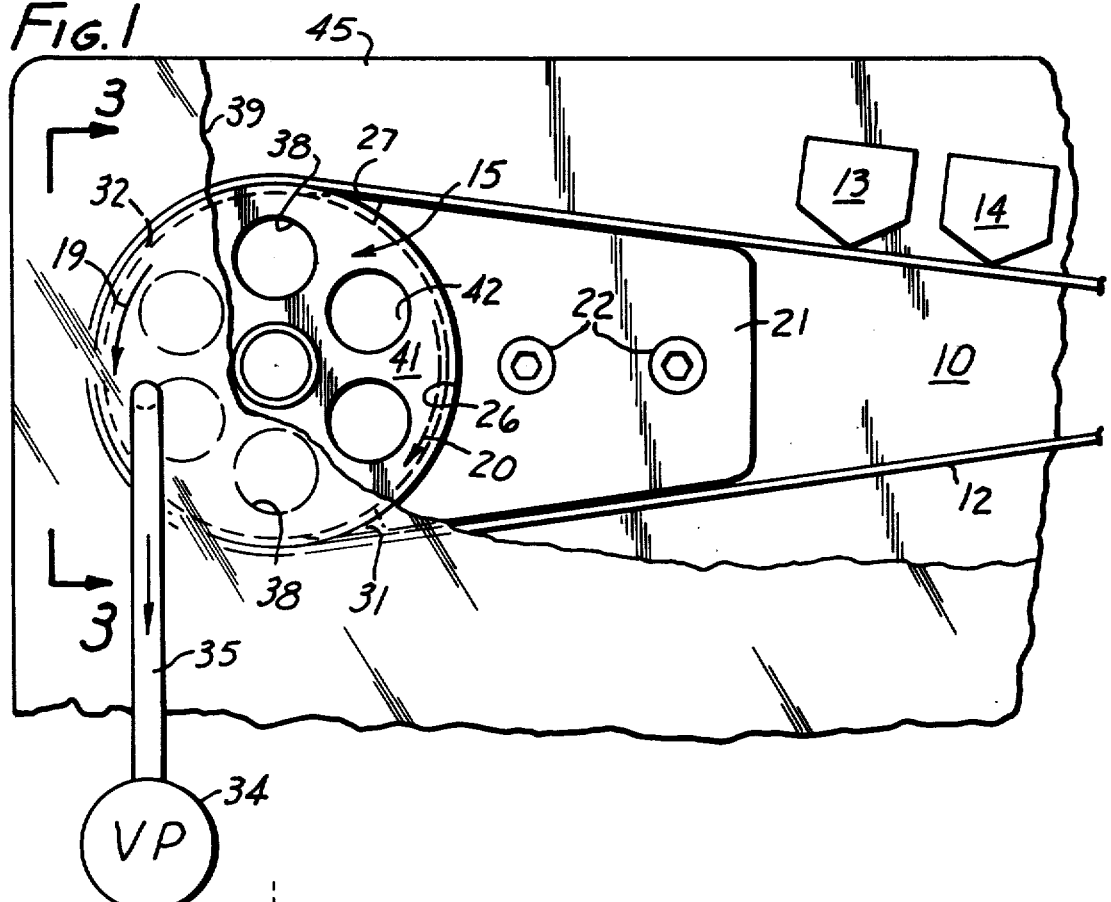
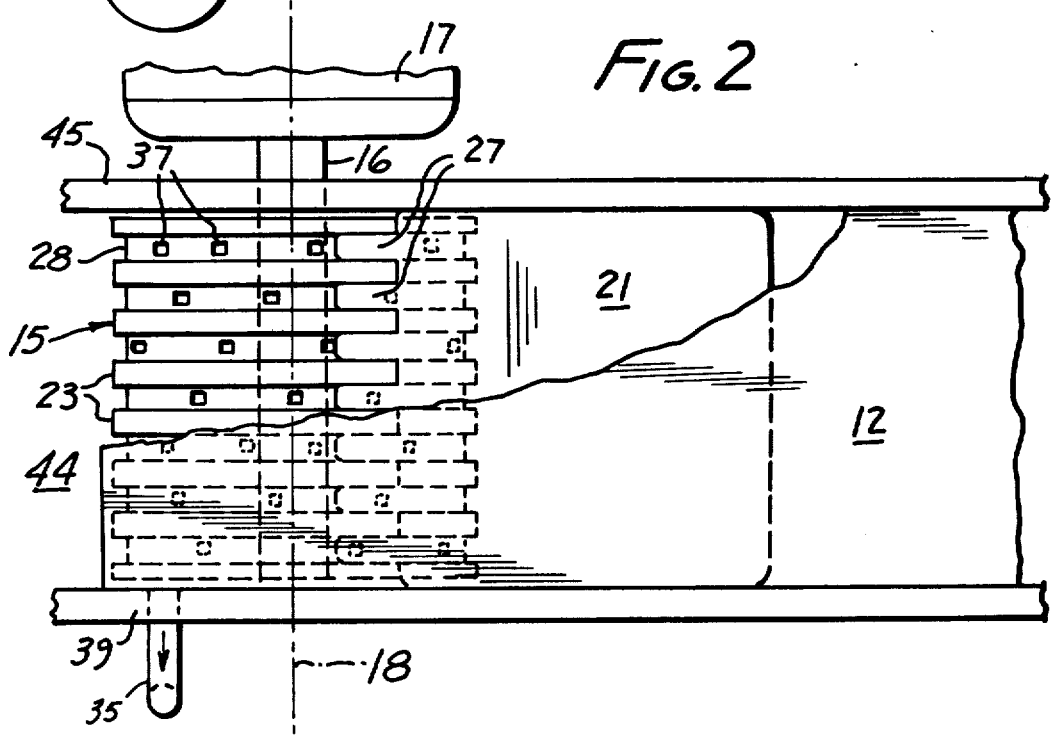

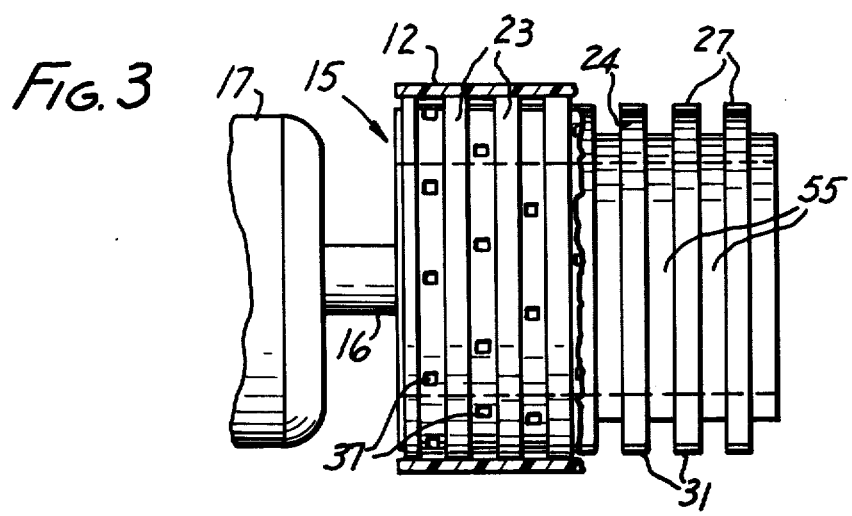
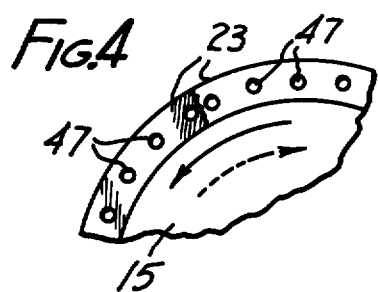
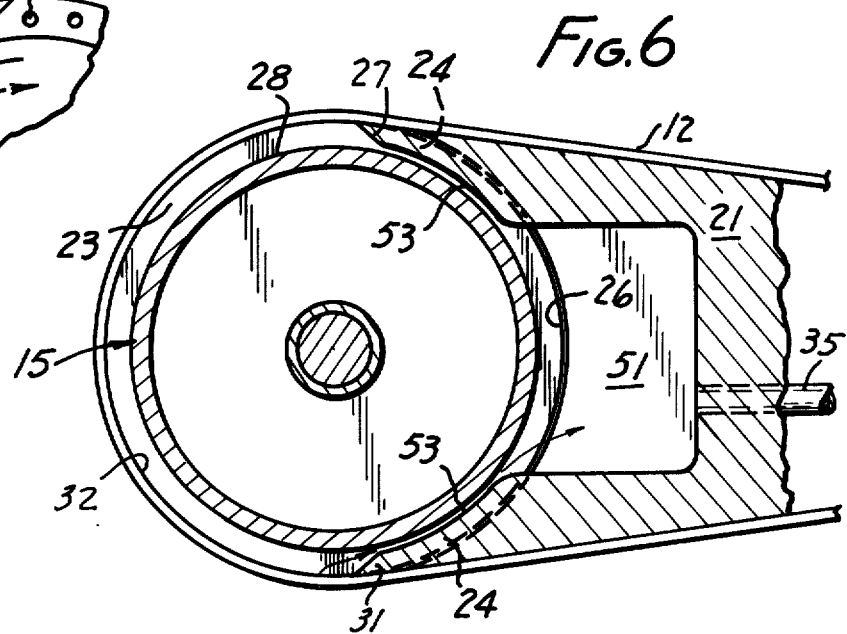
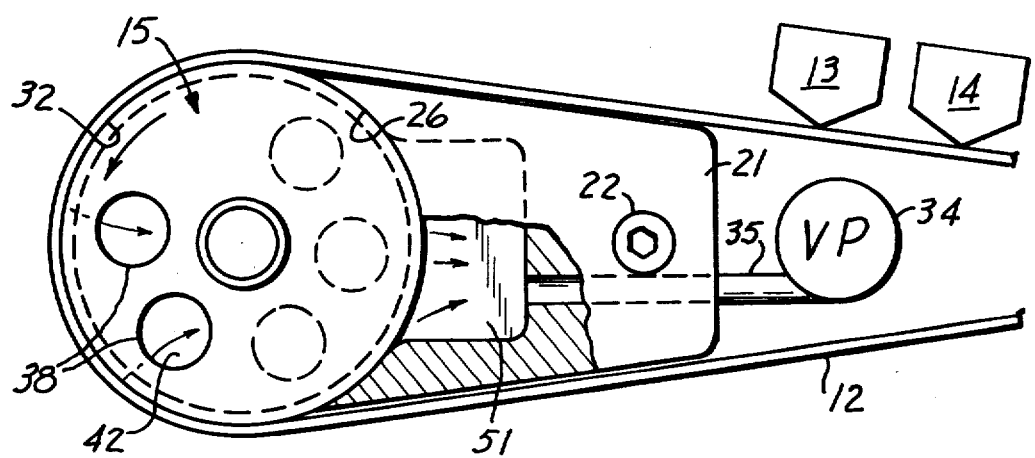

TAPE ADVANCING METHODS AND APPARATUS

BACKGROUND OF THE INVENTION

1. Field of the Invention

The subject invention relates to methods and apparatus for advancing tape, including by way of example magnetic and other recording tape and various tape, web and sheet-like materials. The subject invention more specifically relates to magnetic and other tape recording and reproducing methods and apparatus and to magnetic tape transports.

2. Prior-Art Statement

In the context of methods and apparatus for advancing a magnetic recording or other tape, it is frequently important to achieve rapid tape speed changes at minimum energy expenditure. Especially in bidirectional tape drives, it is frequently essential that the tape reverse its direction of travel as rapidly as possible without overloading the system. Similar desiderata occur in the context of other high-performance systems requiring high tape acceleration and deceleration capability.

In this respect, the tape drive capstan, as a traditional tape drive element, brings into play countervailing considerations. In particular, decreasing the capstan diameter would have the advantage of a relative inertia reduction, thereby removing a major impediment to rapid tape acceleration and deceleration.

Increasing the capstan diameter, on the other hand, would yield the advantages of a larger relative tape speed, enabling more rapid acceleration per revolution, and of a larger capstan-to-tape interface for better tape friction.

Considering at the moment only the countervailing capstan inertia and tape velocity consideration, a point can generally be found at which the capstan diameter presents a tradeoff between inertia and tape velocity in the sense of a minimum energy expenditure.

In this context, reference may be had to U.S. Pat. No. 3,443,039, by P. A. Bygnes, wherein a capstan is closely straddled by a tape guide block. Since this arrangement in that prior-art proposal removes the tape from contact with all but two small portions of the capstan periphery, pinch rollers have to be provided which clamp the tape to the capstan in the two nip or contact areas for the transfer of motive power to the tape.

Unfortunately, true tape speed in a pinch roller system is not equal to the surface speed of the capstan, since pinch rollers typically are of a compliant kind, being applied to the tape at the capstan with a sufficient amount of pressure to provide the requisite friction at the nip for the desired tape advance. In particular, the pinch roller pressure causes an indentation in the compliant pinch roller whereby the effective radius of the roller is reduced, causing the tape to experience a speed variation as between its entry and exit from the nip. As a result, the tape speed is practically determined by the pinch roller, rather than by the capstan. Pinch rollers also add considerable inertia to capstan servo systems, thus impeding servo bandwidth, and are a frequent source of trouble in terms of difficulty of alignment, exposure to dust and other contaminants and subjection to bearing fatigue and further durability limiting factors.

These negative aspects have led to the development of a pure friction drive known under the term "capstan wrapping", wherein the tape extends around part of the capstan at a sufficient wrap angle to generate the requisite drag force on the tape. As an example of an advanced design providing sufficient wrap angles even when the tape is lifted from the capstan for recording and playback purposes, reference may be had to U.S. Pat. No. 4,054,929, by A. Levy, assigned to the subject assignee and herewith incorporated by reference herein.

That Levy patent shows how capstans may be provided with several circumferential grooves to reduce the inclusion of friction reducing air pockets between tape and capstan. Grooved capstans are also apparent from U.S. Pat. Nos. 3,143,267, by A. R. Maxey, 3,614,338, by P. W. Bogels, 3,840,895, by M. Kubo, and 4,029,249, by P. Nagel et al.

According to U.S. Pat. No. 4,065,044, by A. Painter et al, a vacuum source to one side of a grooved capstan pulls a length of magnetic tape against the capstan periphery by creating a vacuum within the grooves, thereby frictionally engaging the tape with the capstan along the particular wrap angle. Even though that proposal also contemplates reversing the vacuum supply to an air supply to allow the length of magnetic tape to be blown off the capstan in order to disengage the tape therefrom, it can in practice not reliably be avoided that the tape become engaged with the capstan ahead of or beyond the desired wrap angle.

This is particularly the case in rapidly changing bidirectional drives, wherein the tape may more easily become caught by and entangled on the capstan. U.S. Pat. No. 3,122,295, by R. H. Davison et al recognizes this problem and, in the context of a bidirectional tape drive, continuously supplies air to a grooved capstan to prevent the tape from becoming entangled therewith. In practice, this is a rather drastic measure, since the firm adherence of the tape to the capstan as potentially attainable in vacuum capstan systems could be a very valuable property. In particular, a temporary vacuum attachment of the tape to the capstan would permit a reduction of the effective tape/capstan interface, and thereby a reduction of the capstan size with resulting diminution of capstan inertia. However, as may, for instance, be seen from U.S. Pat. No. 3,688,956, by M. J. Kjos, use of a vacuum capstan may engender other problems. According to Kjos, air is drawn from the capstan surface into a hollow capstan in order to draw the tape firmly into contact with the capstan at two capstan surface areas having a pressurized air tape lifting region located there between. In order to avoid entanglement of the tape with the vacuum capstan, Kjos provides so-called "vacuum blocks" inside the apertured hollow capstan. In practice, such "vacuum blocks" tend to impose design and performance limitations on the system, since the "vacuum blocks" have to be maintained stationary within the hollow rotating capstan. Switching the vacuum on and off from the inside of the capstan also generates abrupt air flow changes externally manifested as noise.

A series of prior-art tape drives uses a hollow-cylindrical capstan having peripheral apertures. The tape is attracted to the capstan within a predetermined arc by withdrawing air into the hollow-cylindrical capstan through peripheral apertures located at the time within that arc, and further from the hollow-cylindrical capstan through peripheral apertures located at the time outside of that arc. The tape is guided to a beginning of the mentioned arc and, upon being attracted to the capstan by the mentioned air withdrawal, is driven through that arc by the capstan drive motor. The tape is removed from the capstan at the end of the mentioned arc. Such tape drives are shown in the publication DC MOTORS SPEED CONTROLS SERVO SYSTEMS, an Engineering Handbook by Electro-Craft Corporation, of Hopkins, Minn. 55343, particularly pp. 7-30 to 7-37.

In practice, such prior-art tape drives display relatively abrupt air flow changes at the beginning and the end of the mentioned arc.

Two further references located in a novelty search, namely U.S. Pat. No. 3,560,946, by G. J. Ehalt et al, wherein vacuum shoes are employed for holding record members to a rotor within a constant tolerance, and U.S. Pat. No. 3,872,507, by K. Sano et al, wherein air recesses are formed in the outer peripheral surface of a drum or in spacers provided along the length of a magnetic head, do not appear to suggest a solution to the subject problem.

SUMMARY OF THE INVENTION

It is a general object of this invention to at least partially overcome the disadvantages and satisfy the needs implicit in the above prior-art statement.

It is a related object of this invention to provide improved methods and apparatus for advancing a tape with a rotating tape capstan.

It is a related object of this invention to provide an improved capstan having an optimum diameter in terms of minimum energy consumption relative to maximum tape speed change, acceleration and deceleration capability.

It is also an object of this invention to provide improved tape transports and drives.

It is a related object of this invention to provide improved information transducing systems.

It is a germane object of this invention to provide improved magnetic tape transports and recording/playback systems.

Other objects will become apparent in the further course of this disclosure.

From one aspect thereof, the subject invention resides in a method of advancing a tape with a hollow-cylindrical tape capstan rotating about an axis, comprising in combination the steps of providing the hollow-cylindrical capstan with peripheral apertures, withdrawing air from the inside of said hollow-cylindrical capstan and from said apertures, blocking said apertures externally of the capstan for the extent of a predetermined arc through which the capstan rotates, guiding the tape to an end of said arc as seen in a direction of rotation of the capstan, attracting the tape to the capstan by withdrawal of air through peripheral apertures at said end of the arc, advancing the tape with the rotating capstan to a beginning of said arc as seen in said direction of rotation of the capstan while maintaining the tape attracted to the capstan by withdrawal of air through peripheral apertures, releasing the tape from the capstan at said beginning of the arc, and guiding the released tape away from the capstan.

From another aspect thereof, the subject invention resides in a method of advancing a tape with a tape capstan rotating about an axis, comprising in combination the steps of providing the capstan with circumferential grooves distributed across the capstan, providing in each groove a force for attracting the tape to the capstan, guiding the tape to a first peripheral capstan region extending across the capstan, shielding the tape externally of said capstan against the force in each groove during said guiding to the first peripheral capstan region, attracting the tape to the capstan with the force in each groove at the first peripheral capstan region, advancing the tape with the rotating capstan through an arc to a second peripheral capstan region extending across the capstan, while maintaining the tape attracted to the capstan with the force in each groove, releasing the tape from the capstan at the second peripheral capstan region, guiding the released tape away from the capstan, and shielding the tape externally of said capstan against the force in each groove during said guiding away from the capstan.

From another aspect thereof, the subject invention resides in a method of advancing the tape with a tape capstan rotating about an axis, comprising in combination the steps of providing the capstan with circumferential grooves distributed across the capstan, withdrawing air from each groove for attracting the tape to the capstan, guiding the tape to a first peripheral capstan region extending across the capstan, shielding the tape against the withdrawal of air in each groove during said guiding to the first peripheral capstan region, attracting the tape to the capstan by the withdrawal of air in each groove at the first peripheral capstan region, advancing the tape with the rotating capstan through an arc to a second peripheral capstan region extending across the capstan, while maintaining the tape attracted to the capstan by withdrawal of air from each groove, releasing the tape from the capstan at the second peripheral capstan region, guiding the released tape away from the capstan, and shielding the tape against withdrawal of air in each groove during said guiding away from the capstan.

From another aspect thereof, the subject invention resides in apparatus for advancing a tape, comprising, in combination, a tape capstan having circumferential grooves distributed across the capstan, means coupled to the tape capstan for providing a force in each groove attracting the tape to the capstan, means for guiding the tape to a first peripheral capstan region extending across the capstan, means connected to said capstan for rotating said capstan to advance the tape through an arc to a second peripheral capstan region extending across the capstan, while the tape is attached to the capstan by the force in each groove, means for releasing the tape from the capstan at said second peripheral capstan region and for guiding the released tape away from the capstan, and means for shielding the tape externally of said capstan against the force in each groove during said guiding to the first peripheral capstan region and during said guiding away from the capstan.

From another aspect thereof, the subject invention resides in apparatus for advancing a tape, comprising, in combination, a tape capstan having circumferential grooves distributed across the capstan, means coupled to the tape capstan for withdrawing air from each groove to attract the tape to the capstan, means for guiding the tape to a first peripheral capstan region extending across the capstan, means connected to said capstan for rotating said capstan to advance the tape through an arc to a second peripheral capstan region extending across the capstan, while the tape is attracted to the capstan by withdrawal of air from each groove, means for releasing the tape from the capstan at said second peripheral capstan region and for guiding the released tape away from the capstan, and means for shielding the tape externally of said capstan against withdrawal of air in each groove during said guiding to the first peripheral capstan region and during said guiding away from the capstan.

From another aspect thereof, the subject invention resides in apparatus for advancing a tape, comprising, in combination, a tape capstan, a block for guiding the tape selectively to and away from the capstan, first and second interdigitated ridges on the capstan and the guiding block, respectively, with the first ridges extending circularly around the capstan and the second ridges extending for the length of a first predetermined arc along part of the capstan, means coupled to the capstan for establishing between each adjacent pair of first ridges and only for the extent of a second arc complementary to said first arc a force for attracting the tape into engagement with the first circular ridges, and means for rotating the capstan relative to the guiding block.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which:

FIG. 1 is a side view, partially in section, of essential parts of a vacuum tape transport or drive according to a first preferred embodiment of the subject invention;

FIG. 2 is a top view of the drive shown in FIG. 1;

FIG. 3 is a view, partially in section, along the line 3—3 in FIG. 1, with lateral parts omitted for increased clarity.

FIG. 4 illustrates a first modification according to a preferred embodiment of the subject invention;

FIG. 5 is a view similar to FIG. 1, illustrating a further modification in accordance with a preferred embodiment of the subject invention; and FIG. 6 is a view in part similar to FIG. 5, illustrating a modification according to a further embodiment of the subject invention.

DESCRIPTION OF PREFERRED EMBODIMENTS

The tape transport 10 shown in FIG. 1, by way of example, has the objective of moving a magnetic recording tape past a series of read, write, recording, reproduction or erasing heads, two of which are shown at 13 and 14. The transport 10 is part of a bidirectional tape drive system requiring in its operation rapid changes in tape advance direction and rapid tape acceleration deceleration and other tape speed variation, such as in the context of a high-performance instrumentation tape recorder.

In accordance with conventional practice, the tape transport may also include the tape reel drives and tape loop formers shown, for instance, in the above mentioned U.S. Pat. No. 4,054,929, by A. Levy, herewith incorporated by reference herein. A tape capstan 15 is mounted on a shaft 16 of a capstan drive motor 17 which rotates the capstan about an axis 18 in a first sense 19 for advance of the tape 12 in a first direction, and alternatively in a sense of rotation 20 for an advance of the tape in the opposite direction.

A block 21 is mounted by screws 22 on a plate 45 adjacent the capstan 15 for guiding the tape 12 selectively to and away from the capstan 15, depending on the sense of capstan rotation and direction of tape travel.

The capstan 15 and guide block 21 jointly have first and second interdigitated ridges 23 and 24. The first ridges 23 extend circularly around the capstan 15 and the second ridges 24 extend for the length of a first predetermined arc 26 along part of the capstan. Terminal portions of the second ridges 24 appear as fingers 27 reaching into first grooves 28 between the capstan ridges 23 at a first extremity of the arc 26, and as fingers 31 reaching into the capstan grooves 28 at a second extremity of the arc 26.

While the arc 26 extends between 27 and 31, a second arc 32 extends between 27 and 31 complementary to the first arc 26. The arcs 26 and 32 together form a full circle around the circumference or periphery of the circular capstan 15.

An air or vacuum pump 34 is coupled to the capstan via an air conduit 35 for establishing in the capstan grooves 28 a force for attracting the tape 12 for the first ridges 23 of the capstan 15 into intimate force-transmitting contact therewith. Several embodiments are shown in the drawings for establishing the desired tape attracting force between each adjacent pair of first ridges only for the extent of the second arc 32.

As shown in FIGS. 2 and 3, the force establishing means include a plurality of peripheral apertures 37 in the capstan, distributed across and around the capstan 15 and positioned for sequential blocking by the second ridges 24 of the guide block 21 during rotation of the capstan.

The capstan 15 is hollow-cylindrical, and has lateral apertures 38 for coupling the peripheral apertures 37 to the vacuum pump 34. In particular, the pump 34 is coupled to the peripheral apertures 37 via conduit 35, vacuum column plate 39, apertured side 41 of the capstan and hollow space 42 within the capstan for withdrawing air through the unblocked apertures 37; that is, through those of the apertures 37 that at the time are located within the second arc 32.

For each circumferential groove 28 of the capstan there is a complementary curved guide block ridge 24 extending in the particular groove 28 from the end to the beginning of the arc 26 as seen in the direction of capstan rotation.

Accordingly, those of the peripheral apertures that are situated at the time within the first arc 26 are blocked against a withdrawal of air by the second ridges 24 of the tape guide 21 reaching into the capstan grooves 28.

In this manner, the block 21 shields the tape 12 externally of the capstan during the guiding of the tape to a beginning 27 or 31 of the arc 32 against the force or forces created by air withdrawal from the capstan grooves 28 within that second arc.

Depending on the direction of capstan rotation, either of the set of fingers 27 or 31 strips or actually releases the tape 12 from the capstan at the end of the arc 32, and the block 21 also shields the tape externally of the capstan 15, during its guiding away from the capstan, against the force or forces generated by air withdrawal from the grooves 28 within the arc 32. This in practice renders it impossible for the tape to become entangled with the capstan, even during the most rapid reversals of capstan rotation.

As seen in FIGS. 1 and 2, the rotating capstan 15 and tape guide block 21 may in effect be located in a vacuum column 44 laterally bounded by plates 39 and 45 of glass and metal or another material, respectively. The plates 39 and 45 may be spaced by the width of the tape 12 whereby substantial loss of the required vacuum or underpressure is effectively avoided.

According to the modification in accordance with the embodiment of the subject invention shown in FIG. 4, the capstan apertures 37 are supplemented or replaced by apertures 47. Unlike the radial apertures 37, the apertures 47 extend laterally through the first ridges 23 of the capstan 15, such as in parallel to the axis of rotation 18 of the capstan. The apertures 47 again are positioned for sequential blocking by the second ridges 24 during rotation of the capstan through the arc 26. The air conduit 35 and vacuum column plates 39 and 45 may again be employed for coupling the pump 34 to the peripheral capstan apertures 47 for a withdrawal of air from the grooves 28 within the arc 32.

According to the alternative embodiment of the subject inventions shown in FIG. 5, the tape guiding block 21 has an internal cavity 51 within the arc 26; that is, opposite the arc 32. The guide block cavity 51 is coupled to the pump 34 via conduit 35. If the capstan 15 and block 21 are configured and interrelated as shown in FIGS. 1 to 3, air is withdrawn from the capstan grooves 28 in between the first ridges 23 in series through peripheral apertures 37 situated at the time within the second arc 32, through the space 42 in the hollow-cylindrical capstan 15, through further peripheral apertures 37 situated at the time within the first arc 26, and through the cavity 51 in the guiding block 21. The withdrawn air is removed from the guiding block cavity 51 via conduit 35 to the pump 34, as shown in FIG. 5.

The lateral capstan apertures 38 may be omitted in the embodiment of FIG. 5. On the other hand, if objectionable loss of vacuum or underpressure from the capstan region is avoided through provision of lateral vacuum column plates 39 and 45, or otherwise, the lateral apertures or cut-outs 38 may be provided to reduce capstan inertia.

In all embodiments, loop forming and other tape transport functions may be performed by or with the aid of vacuum columns including, for instance, plates 39 and 45.

In the alternative embodiment of the subject invention shown in FIG. 6, the capstan 15 has grooves 28 alternating with the first ridges 23 and providing curved spaces between the second ridges 24 of the block 21 and the capstan 15 at the bottom of the grooves 28 for a withdrawal of air from the grooves 28 via the tape guide cavity 51 and air conduit 35 leading to the pump 34. In particular, air is withdrawn from portions of the capstan grooves 28 situated within the second arc 32, through the curved spaces 53 and tape guide cavity 51 located within or at the first arc 26. Again, the tape guide block 21 with its alternating curved ridges 24 and intervening grooves 55 shields the tape 12 against the effects of the air withdrawal from the capstan grooves 28 during the guiding of the tape toward and away from the capstan 15.

As in the above mentioned Electro-Craft design, the second arc 32 in the illustrated transports is longer than the first arc 26, with such first arc extending over less than one-half the capstan circumference. In this manner, the tape 12 has an optimum wrap angle as to the capstan 15.

The illustrated preferred embodiments also optimize the exposure of the tape 12 to the forces generated by the illustrated air withdrawals. By way of contrast, structural considerations in prior-art apertured vacuum capstan designs practically limited the effective aperture area to less than one-half of the capstan surface.

For instance, three-eighth of the outer capstan surface was a practical limit for the total area of peripheral apertures. By providing alternating ridges 23 and intervening grooves 28 across the capstan 15, the illustrated preferred embodiments provide for an increase of the exposure of tape to the vacuum or under-pressure created in the grooves 28 to a total of from more than one-half up to two-third of the tape area engaging in capstan ridges 23.

In accordance with a further preferred embodiment of the subject invention, the peripheral apertures 37 or 47 are staggered relative to each other across the capstan 15, so that no set of apertures extending across the capstan is located on a line extending parallel to the axis of rotation 18. In this manner, the latter preferred embodiment of the subject invention avoids sharp discontinuities and noises from a blocking and subsequent release of the peripheral apertures 37 or 47 at the fingers 27 and 31.

The subject invention has several aspects beyond the embodiments so far identified with reference to FIGS. 1 to 6. While such aspects are not necessarily limited to what is shown in the drawings, they hereby are described with reference to the accompanying drawings and their reference numeral system.

In particular, the subject invention provides a method of advancing a tape 12 with a tape capstan 15 rotating about an axis 18 and provides a force for attracting the tape 12 to the capstan 15.

This force is distributed across the capstan, such as by the provision of grooves 28, for the extent of a predetermined arc 32 through which the capstan rotates. The tape 12 is guided to a beginning, such as at 27, of the arc 32, and is shielded externally of the capstan 15, such as by the guide block 21 with alternating ridges and grooves 24 and 55, against the tape attracting force during the latter guiding of the tape 12 to a beginning of the arc 32. The tape 12 is attracted to the capstan with the mentioned distributed force at the beginning of the arc 32, such as at 27, and is advanced through the arc 32 with the rotating capstan to an end of that arc, such as at 31, while such tape 12 is attracted to the capstan 15 with the mentioned distributed force. The tape is released or stripped from the capstan at the end of the arc 32, such as by means of fingers 31 projecting from the guide block 21. The released or stripped tape is guided away from the capstan and is shielded externally of such capstan against the above mentioned tape attracting force during the latter guiding away from the capstan 15. As shown in the drawings, such guiding away and shielding of the mechanically removed tape may also be performed by the guide block with alternating ridges and grooves 24 and 55.

As shown in the drawings, the tape attracting force may be a suction force, created typically by a removal of air through peripheral capstan apertures 37 or 47 or through curved clearances 53 between guide block ridges 24 and bottom regions of capstan grooves 28.

The air withdrawal may proceed via the space inside a hollow capstan 15 and/or via a space inside the tape guide block 21. The arc 26 within which peripheral capstan apertures 37 or 47 are blocked by ridges 24 of the tape guide 21, or within which air is withdrawn from the grooves 28 as shown in FIGS. 5 and 6, is preferably smaller than one-half the circumference of the capstan 15. Conversely, the arc 32 for the extent of which the tape 15 is attracted to the capstan 15 in driving force transmitting engagement, is typically longer than one-half the circumference of the capstan 15. In this manner, the embodiments of the subject invention distinguish themselves favorably from those prior-art vacuum capstan designs in which the tape/capstan interface available for effective driving power transmission was less than half the capstan circumference.

According to the currently best mode contemplated for carrying the subject invention into effect, a force for attracting the tape to the capstan is provided in each capstan groove 28 for the extent of the arc 32. As already discussed, the expression "force" as herein employed is intended to be broad enough to cover several distributed forces, such as provided by the withdrawal of air through peripheral apertures 37 or 47 which are unblocked at the time. Also, while the generation of tape attracting forces through withdrawal of air is presently considered to constitute the best mode for carrying the subject invention into effect, there are other methods, including electrostatic or magnetic attraction for applying the tape 12 forcefully to the capstan 15 or its circumferential ridges 23.

Of course, the method of tape attraction will in practice depend largely on nature and purpose of the tape 12. For instance, a magnetic recording tape would not typically be magnetically attracted. On the other hand, a foil of magnetic material in the context of a manufacturing operation could well be. In that case, the block 21 would include magnetic shielding elements or would be made of aluminum or another non-ferromagnetic material, whereby the tape 12 is effectively kept away from the magnetism of the capstan 15 during its guiding toward and away from such capstan. Electrostatic attraction may, for instance, be employed in the context of paper manufacture or transport, in which case the capstan would be made of a dielectric or other material that retains an imposed electrostatic charge, while the guide block 21 would preferably be of a grounded metal or other electrically conducting material, keeping electrostatic charges away from the tape 12 during its guiding toward and away from the electrostatically charged capstan 15.

As further shown in the drawings, the tape may, for instance be guided to a first peripheral capstan region extending across the capstan at 27 and may be attracted to the capstan with the mentioned force in each groove 28 at such first peripheral capstan region. The tape may then be advanced with the rotating capstan through arc 32 to a second peripheral capstan region extending across the capstan at 31; while the tape 12 is being maintained attracted to the capstan with the mentioned force in each groove 28. The tape thereupon may be mechanically released from the capstan at the second peripheral capstan region at 31 and guided away from the capstan. During both the mentioned guiding to the first peripheral capstan region and the mentioned guiding away from the capstan, the tape is shielded externally of the capstan against the mentioned air withdrawal or other force in each groove.

As an important feature of the illustrated embodiments of the subject invention, the tape 12, at the end of its travel through the arc 32, is released gently from its attraction to the capstan with the aid of a plurality of fingers 27 or 31, depending on the direction of tape travel or capstan rotation. The fingers 27 and 31 correspond to the capstan grooves 28, and reach into such capstan grooves at the above mentioned first and second peripheral capstan regions, respectively.

As an attracted section of the tape 12 on the capstan 15 approaches the end of the arc 32, it reaches the domain of the fingers 27 or 31 simultaneously with peripheral apertures 37 or 47 below such tape section. The particular section of the tape 12 is then gently released from the capstan 15, as the later apertures are successively blocked by the fingers 27 and 31. A similar release action results from the fingers 27 and 31 present in the embodiment of FIG. 6.

This gradual release action according to the subject invention favorably distinguishes itself from the manifestations of abrupt pressure changes in prior-art vacuum capstan systems.

According to the illustrated preferred embodiments, the grooves 28 have the effect of maintaining a continuous tape attracting force throughout the arc 23; avoiding in particular sharp discontinuities at the fingers 27 and 31 where the tape 12 arrives at or leaves the capstan 15.

Similarly, the fingers 27 and 31 also aid a gentle or gradual application of the tape 12 to the capstan 15 when such fingers are at the beginning of the arc 32 during rotation of the capstan in a particular sense. For instance, if the capstan rotates in the direction 19 indicated in FIG. 1, peripheral apertures 37 or 47 traveling through the arc 26 are only gradually released by the fingers 27 and the pressure created on the tape by air withdrawal through such apertures 37 or 47 is only gradually brought to bear on successive tape increments approaching the capstan for engagement thereof.

Again, a similar effect is exerted on the tape by fingers 27 or 31 in the embodiment of FIG. 6.

In all illustrated embodiments, the fingers 27 and 31 also help shield the tape 12, durings its guiding to the capstan 15 and during its guiding away from the capstan by the block 21, against the tape attracting forces created in the grooves 23 by air withdrawal through apertures 37 or 47 or curved clearances 53, for example.

To this end, and in accordance with the illustrated preferred embodiments, the fingers 27 and 31 preferably are formed by finger-like extensions of the guide block 21; typically of the second ridges 24 thereof, in order to reach in between the first ridges 23 of the capstan 15 interdigitated therewith.

The subject extensive disclosure will suggest or render apparent various modifications and variations within the spirit and scope of the subject invention to those skilled in the art.

I claim:
1. A method of advancing a tape with a hollow-cylindrical tape capstan rotating about an axis, comprising in combination the steps of:
   providing the hollow-cylindrical capstan with peripheral apertures;
   withdrawing air from the inside of said hollow-cylindrical capstan and from said apertures;
   blocking said apertures externally of the capstan for the extent of a predetermined arc through which the capstan rotates;
   guiding the tape to an end of said arc as seen in a direcon of rotation of the capstan;
   attracting the tape to the capstan by withdrawal of air through peripheral apertures at said end of the arc;
   advancing the tape with the rotating capstan to a beginning of said arc as seen in said direction of rotation of the capstan while maintaining the tape attracted to the capstan by withdrawal of air through peripheral apertures;

releasing the tape from the capstan at said beginning of the arc; and guiding the released tape away from the capstan.

2. A method of advancing a tape with a tape capstan rotating about an axis, comprising in combination the steps of:

providing the capstan with circumferential grooves distributed across the capstan;

providing in each groove a force for attracting the tape to the capstan;

guiding the tape to a first peripheral capstan region extending across the capstan;

shielding the tape externally of said capstan against the force in each groove during said guiding to the first peripheral capstan region;

attracting the tape to the capstan with the force in each groove at the first peripheral capstan region;

advancing the tape with the rotating capstan through an arc to a second peripheral capstan region extending across the capstan, while maintaining the tape attracted to the capstan with the force in each groove;

releasing the tape from the capstan at the second peripheral capstan region;

guiding the released tape away from the capstan; and shielding the tape externally of said capstan against the force in each groove during said guiding away from the capstan.

3. A method of advancing the tape with a tape capstan rotating about an axis, comprising in combination the steps of:

providing the capstan with circumferential grooves distributed across the capstan;

withdrawing air from each groove for attracting the tape to the capstan;

guiding the tape to a first peripheral capstan region extending across the capstan;

shielding the tape against the withdrawal of air in each groove during said guiding to the first peripheral capstan region;

attracting the tape to the capstan by the withdrawal of air in each groove at the first peripheral capstan region;

advancing the tape with the rotating capstan through an arc to a second peripheral capstan region extending across the capstan, while maintaining the tape attracted to the capstan by withdrawal of air from each groove;

releasing the tape from the capstan at the second peripheral capstan region;

guiding the released tape away from the capstan; and shielding the tape against withdrawal of air in each groove during said guiding away from the capstan.

4. A method as claimed in claim 3, including the steps of:

making said capstan hollow-cylindrical;

providing said capstan with peripheral apertures in each groove;

withdrawing air from each aperture through the hollow-cylindrical capstan; and continuously blocking peripheral apertures in each groove present along a second arc extending from said second peripheral capstan region back to said first peripheral capstan region while attracting the tape to the capstan throughout the first-mentioned arc by withdrawal of air from each groove through peripheral apertures.

5. A method as claimed in claim 3, including the steps of:

providing for each circumferential groove of the capstan a complementary curved ridge extending in the particular groove from the end to the beginning of said arc as seen in a direction of rotation of the capstan; and shielding the tape with the curved ridge in each groove against withdrawal of air in each groove during said guiding to the first peripheral capstan region and during said guiding away from the capstan.

6. A method as claimed in claim 3, including the steps of:

making said capstan hollow-cylindrical;

providing said capstan with peripheral apertures in each groove;

providing for each circumferential groove of the capstan a complementary curved ridge extending within, and blocking peripheral apertures in, the particular groove from the end to the beginning of said arc as seen in a direction of rotation of the capstan; and withdrawing said air from each groove through said hollow-cylindrical capstan and each unblocked peripheral aperture along said arc.

7. A method as claimed in claim 3, wherein:

said air is withdrawn from each groove into a region located at a side of the capstan opposite said arc.

8. A method as claimed in claim 3, including the steps of:

making said capstan hollow-cylindrical;

providing said capstan with peripheral apertures in each groove; and withdrawing said air from each groove into the hollow-cylindrical capstan through peripheral apertures located at the time within said arc and from the hollow-cylindrical capstan through peripheral apertures located at the time outside of said arc.

9. A method as claimed in claim 2, 3, 4, 7 or 8, wherein:

said releasing of the tape from the capstan includes the steps of providing a plurality of fingers corresponding to said grooves, and reaching with said fingers into said grooves at said second peripheral capstan region.

10. A method as claimed in claim 2, 3, 4, 7 or 8, including the steps of:

providing a plurality of fingers corresponding to said grooves; and reaching with said fingers into said grooves at said first peripheral capstan region.

11. A method as claimed in claim 2, 3, 4, 7 or 8, including the steps of:

providing a plurality of first fingers and a plurality of second fingers corresponding to said grooves;

reaching with said first fingers into said grooves at said first peripheral capstan region; and reaching with said second fingers into said grooves at said second peripheral capstan region.

12. Apparatus for advancing a tape, comprising in combination:

a tape capstan having circumferential grooves distributed across the capstan;

means coupled to the tape capstan for providing a force in each groove attracting the tape to the capstan;

means for guiding the tape to a first peripheral capstan region extending across the capstan;

means connected to said capstan for rotating said capstan to advance the tape through an arc to a second peripheral capstan region extending across the capstan, while the tape is attached to the capstan by the force in each groove;

means for releasing the tape from the capstan at said second peripheral capstan region and for guiding the released tape away from the capstan; and means for shielding the tape externally of said capstan against the force in each groove during said guiding to the first peripheral capstan region and during said guiding away from the capstan.

13. Apparatus for advancing a tape, comprising in combination:

a tape capstan having circumferential grooves distributed across the capstan;

means coupled to the tape capstan for withdrawing air from each groove to attract the tape to the capstan;

means for guiding the tape to a first peripheral capstan region extending across the capstan;

means connected to said capstan for rotating said capstan to advance the tape through an arc to a second peripheral capstan region extending across the capstan, while the tape is attracted to the capstan by withdrawal of air from each groove;

means for releasing the tape from the capstan at said second peripheral capstan region and for guiding the released tape away from the capstan; and means for shielding the tape externally of said capstan against withdrawal of air in each groove during said guiding to the first peripheral capstan region and during said guiding away from the capstan.

14. Apparatus as claimed in claim 13, wherein:

said capstan is hollow-cylindrical and has peripheral apertures in each groove;

said air withdrawing means include means for withdrawing air from each aperture through the hollow-cylindrical capstan; and said shielding means include means at the capstan for continuously blocking peripheral apertures in each groove present along a second arc extending from said second peripheral capstan region back to said first peripheral capstan region.

15. Apparatus as claimed in claim 13, wherein:

said shielding means include for each circumferential groove of the capstan a complementary curved ridge extending in the particular groove from the end to the beginning of said arc as seen in a direction of rotation of the capstan and shielding the tape against withdrawal of air in each groove during said guiding to the first peripheral capstan region and during said guiding away from the capstan.

16. Apparatus as claimed in claim 13, wherein:

said capstan is hollow-cylindrical and has peripheral apertures in each groove;

said shielding means include for each circumferential groove of the capstan a complementary curved ridge extending within, and blocking peripheral apertures in, the particular groove from the end to the beginning of said arc as seen in a direction of rotation of the capstan; and the air withdrawing means include means for withdrawing air from each groove through the hollow-cylindrical capstan and each unblocked peripheral aperture along said arc.

17. Apparatus as claimed in claim 13, wherein:

said air withdrawing means are located at a side of the capstan opposite said arc.

18. Apparatus as claimed in claim 13, wherein:

said capstan is hollow-cylindrical and has peripheral apertures in each groove; and said air withdrawing means include means for withdrawing air from each groove into the hollow-cylindrical capstan through peripheral apertures located at the time within said arc and from the hollow-cylindrical capstan through peripheral apertures located at the time outside said arc.

19. Apparatus as claimed in claim 12, 13, 14, 17 or 18, wherein:

said releasing means include a plurality of fingers reaching into said grooves at said second peripheral capstan region.

20. Apparatus as claimed in claim 12, 13, 14, 17 or 18, including:

a plurality of fingers reaching into said grooves at said first peripheral capstan region.

21. Apparatus as claimed in claim 12, 13, 14, 17 or 18, including:

a plurality of first fingers reaching into said grooves at said first peripheral capstan region; and a plurality of second fingers reaching into said grooves at said second peripheral capstan region.

22. Apparatus for advancing a tape, comprising in combination:

a tape capstan;

a block for guiding the tape selectively to and away from the capstan;

first and second interdigitated ridges on the capstan and the guiding block, respectively, with the first ridges extending circularly around the capstan and the second ridges extending for the length of a first predetermined arc along part of the capstan;

means coupled to the capstan for establishing between each adjacent pair of first ridges and only for the extent of a second arc complementary to said first arc a force for attracting the tape into engagement with the first circular ridges; and means for rotating the capstan relative to the guiding block.

23. Apparatus as claimed in claim 22, wherein:

said force establishing means include a plurality of peripheral apertures in the capstan distributed across and around the capstan and positioned for sequential blocking by said second ridges during rotation of the capstan, and means coupled to said apertures for withdrawing air through unblocked apertures.

24. Apparatus as claimed in claim 22, wherein:

said force establishing means include a plurality of apertures extending laterally through said first ridges and positioned for sequential blocking by said second ridges during rotation of the capstan, and means coupled to said apertures for withdrawing air from in between said first ridges and through said apertures.

25. Apparatus as claimed in claim 22, wherein:

said capstan is hollow-cylindrical; and said force establishing means include a plurality of peripheral apertures in the capstan distributed across and around the capstan, and means connected to, and extending into, said block for withdrawing air from in between said first ridges in series through peripheral apertures situated at the time within said second arc through the hollow-cylindrical capstan, through peripheral apertures situated at the time within said first arc, and through the guiding block.

26. Apparatus as claimed in claim 22, wherein:
said capstan has grooves alternating with said first ridges and providing curved spaces between the second ridges and the capstan; and
said force establishing means include means connected through said block to said curved spaces for withdrawing air through said curved spaces from in between said first ridges.

27. Apparatus as claimed in claim 23, 24 or 25, wherein:
said apertures are staggered across the capstan.

28. Apparatus as claimed in claim 22, 23, 24, 25 or 26, wherein:
said second ridges have finger-like extensions reaching in between said first ridges.

* * * * *